Patented Nov. 13, 1951

2,574,481

UNITED STATES PATENT OFFICE 2,574,481

PRODUCING 4 - VINYL - 1 - CYCLOHEXENE AND 1,3 - BUTADIENE OF HIGH PURITY

John C. Hillyer, Bartlesville, Okla., assignor to Phillips Petroleum Company, a corporation of Delaware No Drawing. Application August 17, 1949, Serial No. 110,889

5 Claims. (Cl. 260—666)

This invention relates to the preparation of 4-vinyl-1-cyclohexene. It also relates to the preparation of 1,3-butadiene of high purity. Among its various aspects the invention relates to the preparation of 4-vinyl-1-cyclohexene in good yields from 1,5-cyclooctadiene. In another of its aspects the invention relates to the preparation of good yields of 4-vinyl-1-cyclohexene from 1,5-cyclooctadiene by an isomerization process. Still, among the various aspects of the invention it relates to a thermal isomerization of 1,5-cyclooctadiene. Also, among the several aspects of the invention it relates to a process for the preparation of a high purity 1,3-butadiene by the thermal treatment of 1,5-cyclooctadiene without formation of any appreciable quantity of undesirable by-product.

4-vinyl-1-cyclohexene has been used as an intermediate for the production of numerous organic chemicals. For example, it may be readily chlorinated to provide 1,2-dichloro-4-α, β-dichloroethyl-cyclohexane, a compound which is valuable as an insecticide and as a solvent for other insecticides such as dichloro-diphenyl-trichloroethane (DDT), hexachlorocyclohexane, and the like. Heretofore 4-vinyl-1-cyclohexene has been produced by the thermal dimerization of 1,3-butadiene. The foregoing subject matter is disclosed and claimed in Serial No. 62,217, filed November 26, 1948 by Edwin G. Marhofer.

1,3-butadiene has also been used extensively in the production of numerous products and organic chemicals. For example, it has been used extensively in the preparation of polymers used in the production of synthetic rubbers.

Therefore, a process which will yield large quantities of both 4-vinyl-1-cyclohexene and 1,3-butadiene of high purity by simple operational means, more especially in one operation, is to be highly desired.

I have now discovered a novel process for the production of 4-vinyl-1-cyclohexene by the thermal isomerization of 1,5-cyclooctadiene. According to the process of my invention, 1,5-cyclooctadiene is passed through a suitable thermal isomerization zone at or near atmospheric pressure at considerably elevated temperatures to provide 4-vinyl-1-cyclohexene as the principal product.

Since it is known that 4-vinyl-1-cyclohexene may be prepared from the thermal dimerization of 1,3-butadiene, it might be presumed that the mechanism of my reaction proceeds through the cracking of 1,5-cyclooctadiene to form 1,3-butadiene which is subsequently dimerized to 4-vinyl-1-cyclohexene. However, results of a series of studies on the thermal dimerization of 1,3-butadiene using varying temperatures, pressures, and residence times, showed conversions of an order of magnitude far too low to account for the high yields of 4-vinyl-1-cyclohexene obtained under any combination of conditions contemplated by my invention.

For example, when dimerizing butadiene at a temperature of 800° F., a residence time of 18 seconds, and a pressure of 14.5 pounds per square inch absolute, the per cent conversion to 4-vinyl-1-cyclohexene was about 16 per cent. By the process of my invention, operating with 1,5-cyclooctadiene under approximately the same conditions, the conversion was about 53 per cent to 4-vinyl-1-cyclohexene. Based on theoretical calculations, a conversion of this magnitude could not be obtained by thermal dimerization of 1,3-butadiene without the use of a residence time at least 100 per cent greater than the maximum contemplated by my process or a pressure between 300 and 400 per cent of my maximum limit.

In the process according to the invention, the temperature in the reactor is maintained between 650° F. and 1000° F., but preferably in the range between 700° F. and 900° F. Below this temperature range substantially no isomerization occurs due to the thermal stability of 1,5-cyclooctadiene. At higher temperatures decomposition of the isomerization product and the 1,5-cyclooctadiene itself forms light gases and various heavy polymers. Also, at such higher temperatures, solids and the like are formed to a large extent and the reaction becomes very inefficient. Deposition of a solid yellow polymer within the reactor may become a problem above the optimum temperature level. Within the temperature range cited, however, a good proportion, usually above 50 per cent, of the 1,5-cyclooctadiene is isomerized to 4-vinyl-1-cyclohexene when the other reaction conditions are also adjusted within the ranges as discussed below.

The pressure within the reactor is maintained within the range of five to twenty pounds per square inch absolute. I have found it convenient to operate at a pressure just sufficiently above atmospheric to force the feed stream through the isomerization zone at the flow rates described below.

The rate of flow of 1,5-cyclooctadiene to the reactor is regulated to provide a residence time between five and fifty seconds. Preferably, however, I maintain the residence time of 1,5-cyclooctadiene within the heated zone of the reactor between about 10 and 25 seconds. At more rapid flow rates, conversions are reduced and the quantity of 4-vinyl-1-cyclohexene produced is uneconomically small. Increasing residence time, however, beyond the given limits results in decomposition of both starting material and product and reduced yields again occur. I have found a contact time of approximately 18 seconds, a pressure of about 14.6 pounds per square inch absolute, and a temperature of 800° F. to provide very convenient operating conditions.

Any suitable equipment or series of operating steps may be employed for effecting my isomerization. Usually it will be convenient to admit the starting material to the reactor at a temperature near the level employed in the reaction zone. This may be effected by heating the normally liquid 1,5-cyclooctadiene to its vaporization temperature and leading the vapor so produced through a preheating zone prior to entering the reaction chamber. If desired an inert gas such as nitrogen may be employed as a diluent in the reactor feed stream. The mol ratio of diluent to 1,5-cyclooctadiene may be in the range from about 0.5:1 to 10:1, but will preferably be between about 2:1 and 5:1.

It is a significant feature of my process that 1,3-butadiene of an extremely high degree of purity is obtained as a reaction by-product from the thermal depolymerization of a portion of the 1,5-cyclooctadiene. Thus by operating according to my process 1,3-butadiene can be obtained in a condition ready for immediate use without the necessity of laborious and time consuming operations for the removal of contaminants. Since it is known that 4-vinyl-1-cyclohexene may be depolymerized to form 1,3-butadiene, it might appear that the 1,3-butadiene product of my process is formed by the thermal isomerization of 1,5-cyclooctadiene to 4-vinyl-1-cyclohexene which is subsequently depolymerized to 1,3 - butadiene. However, it is known in the art that the pyrolysis of 4-vinyl-1-cyclohexene results in mixtures of 1,3-butadiene with various other light gases.

Since as previously mentioned it is known that 4-vinyl-1-cyclohexene can be pyrolyzed to yield 1,3-butadiene in greater or lesser amounts together with other hydrocarbon by-products, it is desirable when preparing 1,3-butadiene by my process to operate at a temperature below that at which the cracking of concomitantly formed 4-vinyl-1-cyclohexene takes place. I have found that for such purpose, operation within the range 650° F. to 900° F. is desirable. When so operating, 1,3-butadiene of a purity of 99.5 per cent or higher can be obtained.

*Example*

A run was made wherein nitrogen and vaporized 1,5-cyclooctadiene were admixed in a mol ratio of 2.25 to 1 and preheated to a temperature of about 600° F. This stream was then passed to an isomerization zone and heated at 800° F. for an average residence time therein of 17.9 seconds at 737 mm. (atmospheric) pressure. Two weighed Dry Ice traps were connected in series with the outlet of the reactor to condense the effluent and the product recovered therefrom by fractional distillation. A per pass conversion to 4-vinyl-1-cyclohexene of 52.8 per cent was obtained. A very pure sample of 1,3-butadiene amounting to 18.5 per cent of the reactor effluent was recovered as a by-product. Infra-red analysis of a sample of this by-product showed a purity of 99.5+ per cent 1,3-butadiene.

It is within the scope of this invention to employ a contact mass in the isomerization zone, as will be apparent to one skilled in this art.

Reasonable variation and some modification are possible within the scope of the foregoing disclosure and the appended claims to the invention the essence of which is that a process for the preparation of both 4-vinyl-1-cyclohexene and 1,3-butadiene of high purity, in a single operation, from 1,5-cyclooctadiene has been set forth and described.

I claim:

1. The treatment of 1,5-cyclooctadiene by heating the same to a temperature in the approximate range of 650° F.–1000° F. for a time sufficient to form 4-vinyl-1-cyclohexene.

2. The treatment of 1,5-cyclooctadiene by heating the same to a temperature in the approximate range 650° F.–900° F. for a time sufficient to form both 4-vinyl-1-cyclohexene and 1,3-butadiene.

3. The treatment of 1,5-cyclooctadiene by heating the same to a temperature in the approximate range 700° F.–900° F. for a time in the approximate range of 5–50 seconds substantially at atmospheric pressure to produce 4-vinyl-1-cyclohexene.

4. The treatment of 1,5-cyclooctadiene by passing it through an isomerization zone at a temperature in the approximate range of 650° F.–1000° F. for a time in the approximate range of 5–50 seconds substantially at atmospheric pressure to produce 4-vinyl-1-cyclohexene.

5. The isomerization of 1,5-cyclooctadiene by passing it through a zone in which it is heated at a temperature of about 800° F. under 14.6 pounds per square inch absolute pressure for a time of about 18 seconds to produce 4-vinyl-1-cyclohexene.

JOHN C. HILLYER.

REFERENCES CITED

The following references are of record in the file of this patent:

Willstater, "Ber. der Deut. Chim. Soc.," vol. 40 (1907), pages 957–64.

Egloff, "The Reactions of Pure Hydrocarbons," Reinhold Publishers, 1937, pages 735, 736.